United States Patent [19]
Stewart et al.

[11] 3,792,260
[45] Feb. 12, 1974

[54] PHOTO-ELECTRIC PROTECTION SYSTEM FOR PLOTTER

[75] Inventors: Edward J. Stewart, Walnut; James B. Olson, Anaheim, both of Calif.

[73] Assignee: California Computer Products, Inc., Anaheim, Calif.

[22] Filed: Mar. 14, 1973

[21] Appl. No.: 341,091

[52] U.S. Cl.................. 250/215, 250/221, 250/222
[51] Int. Cl. .......................................... H01j 39/12
[58] Field of Search.................... 250/221, 222, 215

[56] References Cited
UNITED STATES PATENTS
2,320,346    6/1943    Broekhuysen .................. 250/221 X FOREIGN PATENTS OR APPLICATIONS
417,808    7/1933    Great Britain...................... 250/222

*Primary Examiner*—James W. Lawrence
*Assistant Examiner*—T. N. Grigsby
*Attorney, Agent, or Firm*—Bruce D. Jimerson

[57] ABSTRACT

Mirrors mounted on the moving component of a machine direct the light beam of a photo-electric system for purposes of safety or control. The photo-electric components can then be mounted to stationary components of the machine.

1 Claim, 2 Drawing Figures

PHOTO-ELECTRIC PROTECTION SYSTEM FOR PLOTTER

BACKGROUND OF THE INVENTION

There are numerous applications which require a warning or shut-off signal if a machine component moves to within some predetermined distance of an object. A typical example is that of an operator endangered by being in, or having his hand in, the path of an advancing girder of a heavy X-Y plotting device. It is also desirable to limit the travel of the girder of an X-Y in the normal course of operation in order to protect the apparatus. Conventionally, on machines having long moving components, this signal is derived from interruption of the light beam of a photo-electric system.

Such a system typically consists of a source which emits a beam of light aimed at a photocell placed some distance away. The photocell changes electrical characteristics when the light no longer strikes it because an object has interrupted the light beam. The change of electrical characteristics is sensed electronically to supply the desired signal. When this system is applied to a long machine component, the light source is normally mounted on one end, the cell on the other, so as to locate the light beam a desired distance from the component. This arrangement has the following disadvantages:

1. Electrical connections must be made to the moving machine component. This can be unwieldy and costly especially if there are no other electrical consumers on the component so that special cables or sliding contacts must be provided to supply the photo-electric system.
2. The light, the cell, and the electrical connections add weight to the moving element. In many machines it is desirable to minimize the weight of moving components in order to maximize performance.
3. The reliability and life of the photo-electric system can be degraded by the accelerations and vibration of the moving component. What is actually desired is a system for sensing the proximity of an object which does not require additional electrical connections to the moving part and which does not materially alter the dynamic characteristics of the apparatus.

Accordingly, a primary object of the present invention is to provide a system for protecting operators and spectators from being injured as a result of placing their hands on the plotting surface of an X-Y plotter during its operation.

A further object of the present invention is to provide a system which will protect the apparatus from excursions beyond the normal operating area.

Other objects and advantages will be obvious from the detailed description of a preferred embodiment given herein below.

SUMMARY OF THE INVENTION

A light source projects a beam of light which is perpendicular to one end of a girder or other moving machine element. A mirror mounted on the girder at 45° to the light beam redirects the beam along one side of the girder. Another mirror at the other end of the girder again turns the beam, to a path parallel to its initial path from the source, toward a photocell. Any part of the beam which, when interrupted by a hand or other object, provides the desired control.

The essence of the invention is that the light and photocell can be stationary on the frame of the machine by virtue of the mirrors on the moving element.

DETAILED DESCRIPTION OF A PREFERRED EMBODIMENT

Figure 2:
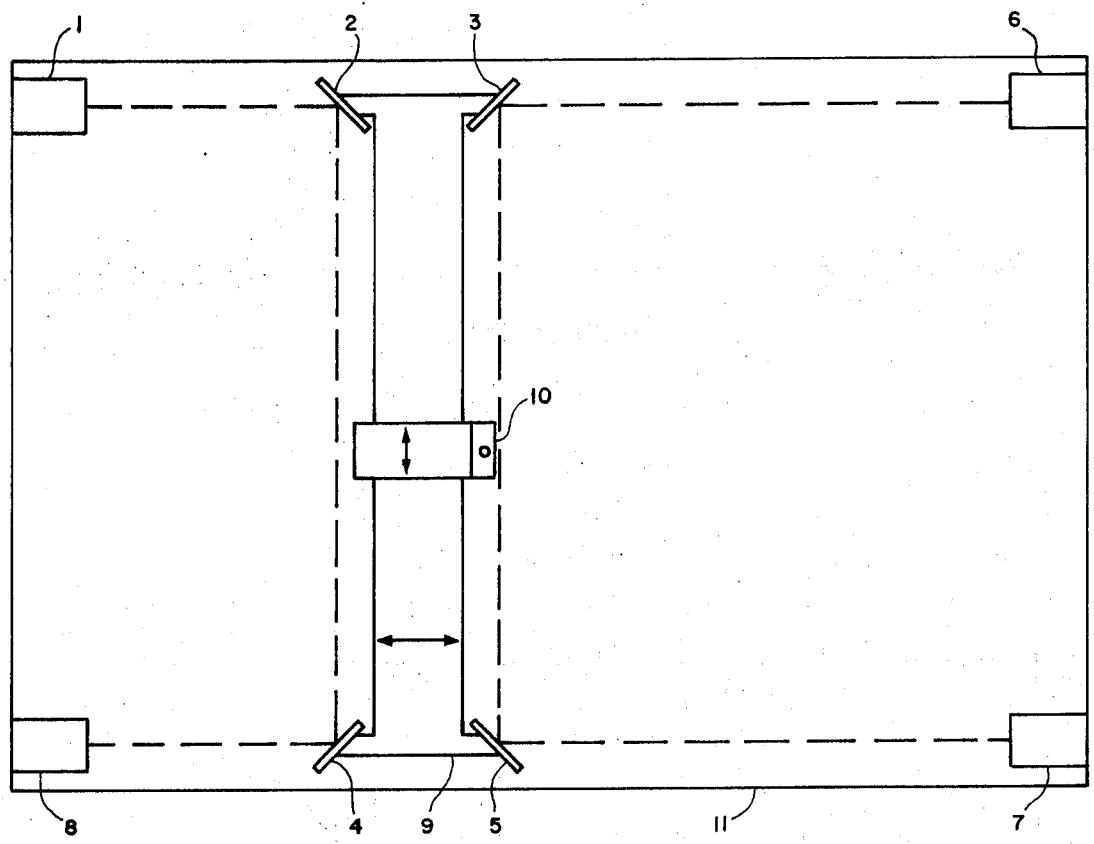
FIG. 2 is a plan view showing the path of the light beam.

Adverting to the drawings, and particularly FIG. 2, the light sources 1 and 6 project concentric beams toward mirrors 2 and 3. Mirrors 2 and 3 divert the beams through 90° toward mirrors 4 and 5 respectively. Mirrors 4 and 5 again divert the beams through 90° back toward the photocells 8 and 7, respectively.

Figure 1:
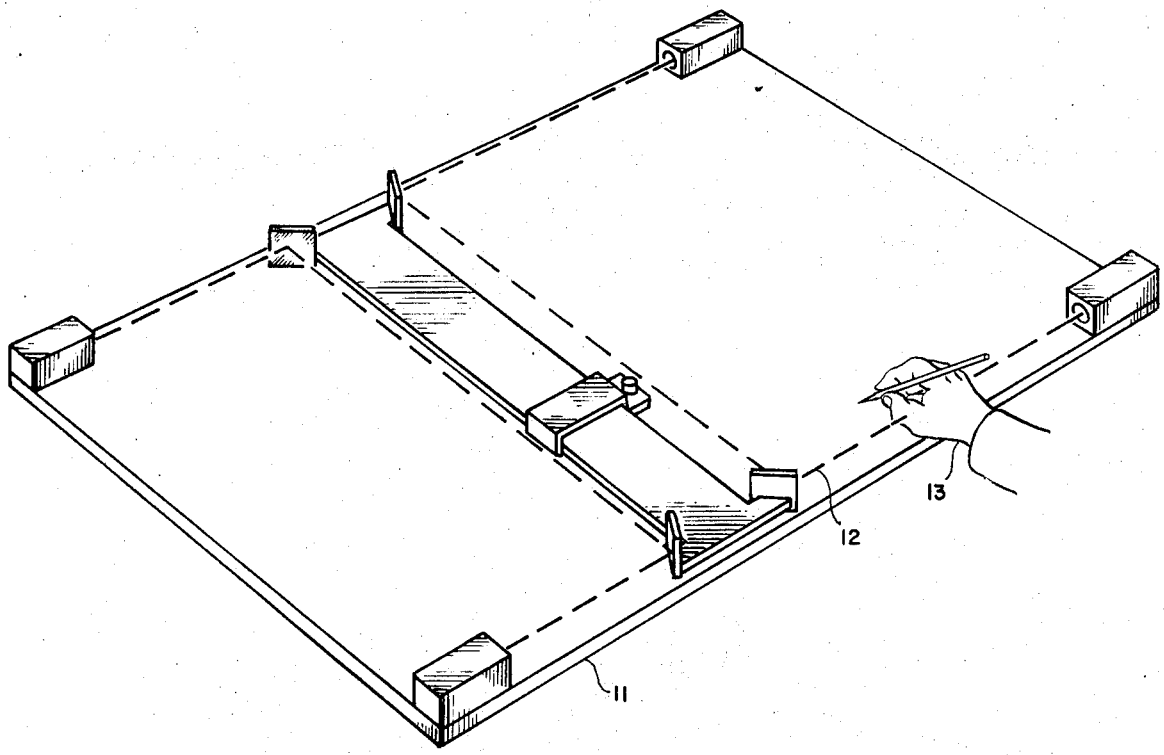
FIG. 1 is a perspective view of the plotter showing an endangered condition.

As shown in FIG. 1, the girder to which the mirrors are affixed moves in a horizontal direction perpendicular to its length as the machine operates. Light sources 1 and 6 are aimed and set to direct the beams to the mirrors 2 and 3 at all points of girder travel. Likewise, mirror settings and photocell placements are such that the beams of light strike the photocells for all points of girder travel. Interruption of either light beam in any of its three segments will block light from the photocell, causing it to change electrical characteristics. This change can be sensed electronically and used to stop or slow girder motion or for other control purposes.

Prior art for such systems requires that the lights and photocells be mounted directly on the girder. This requires that electric cables or other means be provided to supply power to the lights and to conduct photocell signals to control components. This cost and complication is eliminated by this invention which permits mounting of electrical components to stationary portions of the machine. In addition, the elimination of the light and photocell from the moving machine component also removes them from the vibration and accelerations of that component. This can contribute to improved service life from these fragile devices. Moreover, a weight reduction of the moving machine component is realized since four mounted mirrors will usually weigh less than two light sources, two photocells, and the attendant connections and cabling.

An additional advantage of the present invention is that of protecting the machine itself. For example, the movement of girder 9 can be restricted to some selected portion of its total travel by placing objects on the plotting surface. This is useful where computer or operator error would otherwise move the pen or cutter off the workpiece onto the unprotected plotting surface.

Although the basic concept of the invention has been shown and described in connection with a digital plotter, it will be evident that the invention is not limited thereto and that numerous changes, modifications and substitutions may be made without departing from the spirit of the invention.

We claim:

1. A protection apparatus in combination with a plotter of the type having a moving girder which carries the plotting head comprising:

a stationary light source positioned to transmit a light beam in a direction which is perpendicular to said girder;

a first mirror mounted adjacent and stationary with respect to one end of said girder, said first mirror to be positioned to reflect the light beam parallel to said girder;

a second mirror mounted adjacent and stationary with respect to the other end of said girder, said second mirror to be positioned to reflect the light beam reflected from said first mirror in a direction perpendicular to said girder;

photosensitive means for detecting the presence of the beam reflected from said second mirror.

* * * * *